Patented Jan. 14, 1947

2,414,299

UNITED STATES PATENT OFFICE 2,414,299

PRODUCTION OF PROTEIN HYDROLYSATE FLAVORING MATERIAL

Lloyd A. Hall, Chicago, Ill., assignor to The Griffith Laboratories, Inc., Chicago, Ill., a corporation of Illinois No Drawing. Application April 22, 1942, Serial No. 440,086

1 Claim. (Cl. 99—14)

The present invention relates to the production of flavoring materials by the hydrolysis of protein.

The production of amino-acids for use as flavoring has long been effected by enzymatic, or alkaline, or acid hydrolysis of protein. The amino-acid known as glutamic acid, has long been used in the form of mono-sodium glutamate, to provide a meat-like flavor.

In the complete hydrolysis of protein to amino acids there are produced intermediate products presently generally identified as proteoses, peptones, peptides and polypeptides. These have amino groups, and like both protein and an amino acid, they have binding power for acids and alkalis.

I have found that amino-acid protein hydrolysate at a pH of meat in the presence of sodium ions, has a flavor which is improved when there is present additional material which is the product of an incompleted hydrolysis of protein, including the proteoses, peptones, peptides and polypeptides.

The present invention has for its object the treatment of protein to produce a flavoring material containing amino acids and hydrolytic products intermediate between protein and amino acids.

A particular object of the invention is to hydrolyze protein substantially completely to amino acids, then in the presence of said amino acids incompletely to hydrolyze protein to provide additional flavoring material.

Various other and ancillary objects and advantages of the invention will appear hereinafter from the following description and explanation of the invention.

In carrying out the present invention I treat protein by any well known procedure to hydrolyze it substantially completely to amino acids. By a second use of the same or different protein I incompletely hydrolyze to produce products intermediate between protein and amino acids. The two hydrolytic products are provided ultimately in combined form in the presence of sodium ions at a pH below 7 and above 3.2, but preferably at a pH approximating the pH of meat.

The pH of 3.2 is the iso-electric point of glutamic acid as well as of other amino acids. The flavors desired derive in part from sodium salts of the amino acids. The flavor varies with the actual pH and is best at pH below 7, and preferably at pH from 3.2 upwardly. Meat has a pH below 7 with the best grades at pH of about 5.8. The desired flavor for the product of the present invention is a meat-like flavor when at a pH comparable to meat.

When acid is used it is preferred to employ hydrochloric acid in excess of that which can be bound by the resulting amines, as is common in the art. Thus, excess acid may be distilled away as a recovery for re-use. But all the acid cannot be distilled from proteins or their hydrolytic products, since there is a binding power for acids. Where amino groups are present or available, amine-hydrochlorides are formed. Thus, a still residue from a complete hydrolysis effected with such excess of hydrochloric acid, is sufficiently acid for use to effect the desired incomplete hydrolysis on additional protein. Such a practice is contemplated by the present invention.

The course of hydrolysis of protein to completion is relatively slow. To stop a hydrolysis midway, for example, in the course of the complete hydrolysis will be to produce a fractional amount of amino acids and a fractional amount of intermediate products. The amino-acid products will be those most readily formed, and they will not be those or in the proportion of those which result from complete hydrolysis of protein.

The following examples illustrate the invention:

Example 1

2500 lbs. of corn gluten meal having 60% of protein, are added to liquid at 150° F., said liquid being 400 gallons of 20° Bé. aqueous hydrochloric acid solution, and 264 gallons of water. This acid liquid is a solution of approximately 20% acid by weight. Then the temperature is raised to 225° F. and held for 8 hours. Experience has shown that a complete hydrolysis of the protein has taken place.

The hydrolysate is then vacuum filtered to remove insoluble substance including humin, and the solid residue is washed to recover the hydrolytic products as amino acids. Dilute (3%) hydrochloric acid is used in washing three times. The filtrate is then distilled to boil off water and hydrochloric acid. From 42% to 50% of the hydrochloric acid present is thus recovered. Then 125 to 150 lbs. of the same corn gluten are added and the mass is heated to 150° to 160° F. for one hour, whereby to effect a partial hydrolysis of the newly added protein.

A 35% solution of caustic soda in water is added to effect a pH of 2. Then 250 lbs. of activated carbon are added to decolorize the solution. It is heated for about 15 minutes at 180° F. Carbon is filtered off, and the filtrate neutralized by adding caustic soda solution to a pH of 5.5 to 6.0. The neutralized hydrolysate is concentrated to about 60% to 70% solids. The resulting liquid is an excellent flavoring liquid. The second and short hydrolysis provides proteoses, peptones, peptides, and polypeptides, giving a superior taste to the product.

A typical analysis is:

| | | |
|---|---|---|
| Total solids | per cent by weight | 67.34 |
| Chlorides as sodium chloride | do | 25.04 |
| Amino nitrogen | do | 4.2 |
| pH | | 6.15 |

Example 2

The procedure of Example 1 is used, changing the protein in both instances to de-fatted cracklings, as produced by an extraction of residual fat from the crackling residue of lard production, with a volatile fat solvent such as acetone, ethyl ether or refined saturated hydrocarbon solvents boiling at 190° to 222° F. Cracklings have normally 8% to 9% residual fat. The fat content may be reduced to 0% to 3%, with about 1½% economically preferred. Such de-fatted cracklings is referred to in the present application as "crackling protein." Animal skin may be likewise de-fatted and used as is crackling protein.

Example 3

In Example 1, change the second use of protein to the same weight of crackling protein in place of corn gluten, to produce the desired intermediate products.

Thus it is possible in various ways to produce a mixture of complete amino-acid hydrolysate from one kind of protein, and incomplete hydrolysate to proteoses, peptones, peptides and polypeptides, from the same or different protein, all in the presence of sodium ions at a pH selected for the desired taste-quality of the mixture. The process and the product may be varied in many ways without departing from the spirit and scope of the invention as set forth in the appended claim.

I claim:

The method of making a flavoring composition which comprises substantially completely hydrolyzing protein to amino-acid products by the use of hydrochloric acid in excess over that required to form hydrochlorides of the amino-acid products, distilling excess hydrochloric acid from the hydrolysate whereby to leave amino-acid products as hydrochlorides, incompletely hydrolyzing protein to produce products intermediate between protein and amino acid by the hydrolyzing action of the said hydrolysate containing said hydrochlorides, and adding a sodium bearing alkali to neutralize the mixed hydrolytic products to a pH below 7 and above 3.2.

LLOYD A. HALL.